3,790,456
METHOD OF EXTRACTING AND RECOVERING CHROMIUM VALUES FROM CHROMITE ORE

Charles Patrick Bruen, Bernardsville, N.J., and Christian Albert Wamser, Camillus, and Thomas Richard Morgan, Solvay, N.Y., assignors to Allied Chemical Corporation, New York, N.Y.
No Drawing. Filed Feb. 16, 1972, Ser. No. 226,866
Int. Cl. B01k 3/00; C01b 13/14; C22b 3/00
U.S. Cl. 204—61    14 Claims

ABSTRACT OF THE DISCLOSURE

A method of extracting chromium values from chromite ore by digesting the ore with a molten bisulfate, separating the insolubles and electrolyzing the digest fluid to yield an immiscible phase consisting of an oxidized chromium product.

Preliminary thermal oxidation of the chrome ore prior to the digestion step increases the dissolution rate and efficiency in the molten bisulfate.

BACKGROUND OF THE INVENTION

(I) Field of the invention

This invention relates to the recovery of the chromium values of chrome ore.

(II) Description of the prior art

Chrome ore is generally processed on an industrial scale by high temperature alkaline roasting under oxidizing conditions. The sodium chromate formed is leached from the roast and converted to bichromate by acid treatment, and further to chromic acid by another acid treatment. Satisfactory yields of chromate based on ore require two stages of roasting. The final leached waste residue contains residual chromium and represents a disposal problem. Large amounts of sodium sulfate by-product are formed which must be marketed.

On a pilot plant scale, extractive procedures have been reported, generally based on the use of hot concentrated sulfuric acid together with small amounts of catalyst. These processes involve the separation of metal values in the ore as their sulfates, by the technique of partial crystallization, with a correspondingly large loss of sulfuric acid. Chrome products are obtained which generally require further purification before meeting the requirements of many industries.

SUMMARY OF THE INVENTION

Chrome ore such as "chromite" is digested in a molten salt such as ammonium, sodium, or potassium bisulfate, mixtures of these or hydrates thereof. The preferred salt is sodium bisulfate having a melting point of about 180 to 220° C.

Preheating the chrome ore to between about 500 and 1200° C., preferably in an oxidizing atomsphere, prior to the digestion step, increases the dissolution rate of the ore in the melt, and increases the efficiency of the digestion.

The digestion is carried out at a temperature within the range of about 180 to 220° C. Following the digestion, the melt is treated with a small amount of water to lower its fusion temperature to about 130 to 170° C. and the chromium salt is oxidized electrochemically to chromic acid. The chromic acid is separated from the melt as an insoluble phase.

The melt which now contains all the other metals from the ore such as iron, aluminum, and magnesium, along with any residual chromium, is treated with water to form a strong solution of sodium bisulfate/sodium sulfate and an insoluble solid phase containing essentially all the iron, most of the aluminum, and some of the magnesium, as sulfates.

The aqueous phase from the previous step is treated with sulfuric acid to convert sodium sulfate to bisulfate and is then dehydrated to a fusion temperature of about 185–200° C. for recycle to the digestion step.

The above dissolution procedure eliminates some of the difficulties of the methods of the prior art. The chrome ore is opened under comparatively mild conditions, i.e., 180 to 220° C. as compared to 1100 to 1300° C. for alkaline roasting. High yields are attainable since undissolved ore can be recycled into the digestion step. Process wastes consist of the sulfates of iron and aluminum, along with some magnesium, which can be easily re-solubilized for residual chromium recovery if necessary, or processed for recovery of the metal sulfates. One of the desired products (chromic acid) is generated directly while others such as sodium bichromate or chromate can easily be prepared by treating the chromic acid with the requisite amount of sodium carbonate. Any sodium sulfate by-product generated in the process is comparatively small in amount and derives from the necessity of purging recycled sodium bisulfate/sulfate occasionally, as magnesium (and to a lesser extent) aluminum, builds up to undesirable levels.

DESCRIPTION OF THE PREFERRED EMBODIMENTS

One part of chrome ore, ground to about −200 mesh or finer, is digested in about 5 to 15 parts by weight of molten sodium bisulfate. The ratio of ore to bisulfate is not critical, but a proportion within the range given is preferred. Anhydrous sodium bisulfate has a melting point above the 180–220° C. range, but the preferred sodium bisulfate is sufficiently hydrated to provide a melting point substantially within these limits. The mixture of ore and bisulfate is stirred and maintained at a temperature in the range of about 180–220° C. to minimize the formation of pyrosulfate, from the dehydration of bisulfate:

$$2NaHSO_4 \rightarrow Na_2S_2O_7 + H_2O\uparrow$$

The formation of the pyrosulfate is to be avoided, for its presence leads to a rapid increase in the viscosity and fusion temperature of the melt. Provision is made to return water to the reaction mixture, either by operating in a closed system with condensation and return of water, or by the continuous addition of small amounts of water as required to compensate for any lost by vaporization in an open system. The digestion may be carried out for from 1 to 48 hours or more, but the rate of decomposition of the ore falls off after about 6 hours. Prolonged digestion periods become uneconomic.

At the end of the digestion period the mixture is treated with water, added in small increments, until a mixture which remains liquid at 130 to 170° C. is obtained. Any silica and undecomposed ore are filtered from the hot mixture and held for recycle to the digestion step.

It was found that the ore could be made more reactive by a prior thermal oxidation treatment, resulting in an increased dissolution rate in molten sodium bisulfate. Thus, heating a typical chrome ore of composition: 44.6% $Cr_2O_3$, 16.3% $Al_2O_3$, 10.0% MgO, 2.5% $SiO_2$, 19.6% FeO and 6.3% $Fe_2O_3$ at 1000° C. in air for 2 hours, resulted in oxidation of 90% of the FeO to $Fe_2O_3$. Following the heat treatment the oxidized ore composition was essentially that shown above with the iron oxide content shifted from 19.6% FeO, and 6.3% $Fe_2O_3$ to 2.0% FeO, and 25.9% $Fe_2O_3$. Under similar conditions of digestion in molten sodium bisulfate (185° C.), the ground ore, digested without benefit of a preliminary period of thermal oxidation, and the same ore digested after thermal oxidation, showed the following dissolution rates:

Original ore _____ 52% dissolved in 6 hours.
Oxidized ore _____ 83% dissolved in 6 hours.

This behavior is in accord with other observations reported in the literature on increasing the reactivity of chrome ore by thermal oxidation with respect to acid attack (U.S. Pat. 3,105,755). In applying the preliminary heat treatment of the ore, it is recommended that the ground ore be heated within the range of 500 to 1200° C. until at least 40% of the ferrous iron contained therein is oxidized to the ferric state.

Returning to the description of the preferred method, the melt filtrate from the previous step contains predominantly, the sulfates of Cr, Fe, Al, and Mg, partly in solution and partly dispersed as a fine colloidal solid phase. The chromium, which is substantially all in trivalent form, is oxidized electrochemically by transferring the melt into the anode chamber of an electrolytic cell provided with platinum electrodes, and a porous ceramic diaphragm separating the anode and cathode compartments. A sodium bisulfate-water melt (approximate composition $NaHSO_4 \cdot H_2O$) may be used as catholyte. The electrolysis is conducted at a low anode current density (of the order of 20 amperes per square foot). Electrolyte temperatures in the range 120 to 205° C. are satisfactory. At temperatures approaching 197° C. (the melting point of the oxidation product, $CrO_3$) the rate of decomposition of the generated $CrO_3$ catalyzed by the $NaHSO_4$, increases sharply. For this reason the temperature of 205° C., and preferably 200° C., should not be exceeded. The electrolysis is continued until most of the Cr(III) has been oxidized or until the current efficiency drops to an impractical low value.

The product $CrO_3$ has a relatively low solubility in the melt medium and may be isolated by either of two methods:

(1) If the temperature is below 197° C., the product is solid phase and may be separated from the melt by filtration or centrifugal separation.

(2) If the temperature is above 197° C., the oxidized product is liquid phase, and may be recovered by liquid-liquid separation.

If the latter method is used, residence time should be kept to a minimum to avoid any significant decomposition of $CdO_3$. At lower temperatures, (120–150° C.), decomposition of the $CrO_3$ is not significant.

The residual melt from the previous step will consist of sodium bisulfate (containing some sulfuric acid generated during the Cr(III) oxidation):

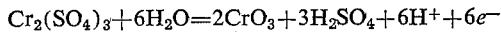

along with appreciable quantities of iron, aluminum and magnesium from the ore, together with some residual chromium (both trivalent and hexavalent).

The mixture is treated with about 50 to 70 parts of water per 100 parts of melt, heated to boiling, then cooled to room temperature and stirred for about 10 to 15 hours. Separation of the solids by filtration yields a liquid phase containing most of the sodium bisulfate together with sulfuric acid, traces of iron, small amounts of aluminum, a large proportion of the magnesium, and most of the remaining hexavalent chromium. In a typical example the separated solid phase contained about 99% of the iron, 78% of the aluminum, 26% of the magnesium, and most of the trivalent chromium.

The liquid phase is treated with sodium sulfate (formed in the cathode compartment of the electrolytic oxidation cell in the previous step as the result of reduction of $H_2$ ions to hydrogen gas) to convert sulfuric acid back to bisulfate. The treated liquid phase is evaporated to remove water until a melt is obtained at 200° C. which is then recycled into the digestion step along with additional sodium bisulfate and the undecomposed ore separated previously. The presence of some aluminum and magnesium in the recycled bisulfate does not lower its efficiency in the ore dissolution step.

The chromic acid produced in the process described above can be purified by recrystallization from water by conventional methods, and sodium bichromate and sodium chromate can be readily prepared from the chromic acid by treatment with the appropriate quantities of sodium carbonate.

Advantages of the process of the present invention are: the ore is decomposed under relatively mild conditions; chromic acid is generated directly by electrolysis in a medium in which it has a low solubility, thus providing a convenient means of separation, the bulk of the ore metals can be separated from the bisulfate by a simple process, the separated bisulfate can be recycled, and bichromate and chromate salts can be readily produced from the chromic acid product.

Example 1

50 grams of ground (−200 mesh) Transvaal chrome ore containing 44.5% $Cr_2O_3$, 19.3% Fe, 15.4% $Al_2O_3$, and 10.7% MgO, is digested in 435 grams of molten sodium bisulfate. The melt is stirred for 24 hours, during which time the temperature is maintained between 185–200° C.

At the end of the digestion period, 50 grams of water are added so that on mixing, a liquid melt is obtained at 150° C. The melt in this form is filtered through a heated sintered glass filter to separate silica and undecomposed ore. From the weight of the insolubles and its chromium content as determined by chemical analysis, the amount of ore decomposed is estimated at 35 grams.

The melt filtrate is transferred into the anode compartment of an electrolytic cell which is provided with platinum electrodes and a porous alundum ceramic diaphragm to separate the anolyte and catholyte. A melt consisting essentially of sodium bisulfate monohydrate, $NaHSO_4 \cdot H_2O$ which has been pre-heated to 150° C. is transferred into the cathode compartment of the cell. The melt is electrolyzed at an anode current density of about 20 amperes per square foot until over 90% of the chromium has been oxidized to chromic acid. The latter separates from the melt and is recovered by filtering the melt through a pre-heated sintered glass filter. The crude product $CrO_3$ thus obtained can be purified by recrystallization from a strong aqueous solution.

The residual melt filtrate (about 470 grams), is treated with 280 grams of water and the mixture boiled for one hour, then allowed to cool and stand (with stirring) for 15 hours at room temperature.

The mixture is filtered, yielding 430 grams of liquid and 320 grams of solids (wet, drained weight). The product weighs 260 grams. After drying to constant weight at 100° C., chemical analysis indicates that the solids contain >99% of the iron from the decomposed ore, 78% of the aluminum, and 26% of the magnesium, present as hydrated sulfates, along with some sodium sulfate and traces of trivalent chromium present in the system.

The liquid phase consists essentially of a strong aqueous solution of sodium bisulfate containing some chromic acid, and traces of dissolved iron, small amounts of aluminum, and somewhat larger amounts of magnesium. This liquid phase is evaporated to produce a melt at about 200° C. for recycle into the digestion step (along with make-up $NaHSO_4$ to replace the sulfate consumed in forming Fe, Al, and Mg sulfates). No sulfate is consumed by the Cr because $Cr_2(SO_4)_3$ is ultimately converted to $CrO_3$.

In separate tests, it is established that the presence of Mg as well as some Al (and traces of Fe) in the bisulfate thus recovered does not affect its efficiency for decomposing chrome ore.

Example 2

In a run identical to that of Example 1 except that the Transvaal chrome ore, after being pulverized to −200 mesh, is heated at 1,000° C. in air for 2 hours, 90% of the contained FeO is oxidized to $Fe_2O_3$. A 50 gram sample is treated as in Example 1. At the end of the digestion period the silica and undissolved ore are separated by filtration through a heated sintered glass filter. From the weight of the dried insoluble matter and its chrome content as determined by chemical analysis, the amount of ore which went into solution is estimated at 45 grams, rather than 35 grams as in the case of Example 1, wherein the ore was not subjected to pre-oxidation.

Various modifications and alterations will become apparent to those skilled in the art without departing from the scope and spirit of the invention, and it should be understood that the latter is not necessarily limited to the aforementioned discussion.

We claim:

1. A method of solubilizing the chromium values of chrome ore comprising, digesting the ore in a molten bisulfate selected from the group consisting of the bisulfates of ammonium, sodium, potassium and the hydrates thereof.

2. The method of claim 1 wherein the chrome ore is subjected to oxidation, to oxidize at least 40% of the contained ferrous iron to the ferric state.

3. The method of claim 1 wherein the bisulfate is a sodium bisulfate, partially hydrated to an extent such that the melting point is about 180–220° C.

4. The method of claim 1 wherein the digestion is carried out within the range of about 180–220° C.

5. The method of claim 1 wherein the composition of the bisulfate is maintained by carrying out the digestion in a closed system whereby water is retained within the system.

6. The method of claim 1 wherein the composition of the bisulfate is maintained by adding make-up water during the digestion period.

7. A process for the production of chromium values from chrome ore comprising: digesting chrome ore with a molten bisulfate selected from the group consisting of the bisulfates of ammonium, sodium, potassium and the hydrates thereof, to produce a melt containing metal values obtained from the ore; separating the molten digest fluid from the insoluble matter contained therein; oxidizing the trivalent chromium present in the separated digest fluid to the hexavalent state; and recovering the chrome values.

8. The process of claim 7 wherein the selected bisulfate is sodium bisulfate having a melting point within the range of about 180–220° C.

9. The process of claim 7 wherein the digestion is carried out at a temperature within the range of 180–220° C.

10. The process of claim 7 wherein the water content of the melt is kept substantially constant during the digestion.

11. The process of claim 7 wherein water is added to the molten digest fluid, to provide a fluid melt at a temperature of about 130 to 170° C. to thus facilitate separation of the contained insoluble matter.

12. The process of claim 7 wherein the insoluble matter separated from the molten digest fluid is recycled to recover any chromium value remaining therein.

13. The process of claim 7 wherein the trivalent chromium in the separated melt is oxidized to the hexavalent state by transferring the melt into the anode compartment of an electrolytic cell provided with a porous diaphragm separating said anode compartment from the cathode compartment, said cathode compartment containing a hydrated sodium bisulfate melt, and subjecting the cell charge to an electric current to effect oxidation and separating the oxidized chromium product.

14. The process of claim 13 wherein the electrolytic oxidation is carried out at a temperature within the range of 120 to 205° C.

References Cited

UNITED STATES PATENTS

| | | | |
|---|---|---|---|
| 2,803,594 | 8/1957 | Westby | 75—121 |
| 2,574,065 | 11/1951 | Schulein | 204—97 |
| 1,872,588 | 8/1932 | Hines | 423—607 |
| 2,772,957 | 12/1956 | Thomsen | 75—115 |

JOHN H. MACK, Primary Examiner

R. L. ANDREWS, Assistant Examiner

U.S. Cl. X.R.

204—97; 75—101 R, 115, 121; 423—53, 607